(12) United States Patent
Gorshe

(10) Patent No.: US 10,306,027 B2
(45) Date of Patent: May 28, 2019

(54) FRAME DELINEATION METHOD FOR A GENERIC FRAMING PROCEDURE

(71) Applicant: Microsemi Solutions (U.S.), Inc., Aliso Viejo, CA (US)

(72) Inventor: Steven Scott Gorshe, Beaverton, OR (US)

(73) Assignee: MICROSEMI SOLUTIONS (U.S.), INC., Aliso Viejo, CA (US)

( * ) Notice: Subject to any disclaimer, the term of this patent is extended or adjusted under 35 U.S.C. 154(b) by 57 days.

(21) Appl. No.: 15/607,433

(22) Filed: May 27, 2017

(65) Prior Publication Data

US 2017/0264717 A1 Sep. 14, 2017

Related U.S. Application Data

(63) Continuation of application No. 14/277,823, filed on May 15, 2014, now Pat. No. 9,736,275, which is a continuation of application No. 13/836,983, filed on Mar. 15, 2013, now Pat. No. 9,344,321.

(60) Provisional application No. 61/682,472, filed on Aug. 13, 2012.

(51) Int. Cl.
*H04L 1/00* (2006.01)
*H04L 29/06* (2006.01)
*H04L 29/08* (2006.01)

(52) U.S. Cl.
CPC ............ *H04L 69/22* (2013.01); *H04L 1/0061* (2013.01); *H04L 29/0653* (2013.01); *H04L 69/324* (2013.01)

(58) Field of Classification Search
CPC .......................... H04L 29/06; H04L 29/0653; H04L 1/0061; H04L 69/324; H04L 69/22
See application file for complete search history.

(56) References Cited

U.S. PATENT DOCUMENTS

| | | | |
|---|---|---|---|
| 5,835,602 A | 11/1998 | Lang | |
| 7,738,601 B2 * | 6/2010 | Thaler | H03M 5/145 370/471 |
| 2006/0092979 A1 * | 5/2006 | Peng | H04L 1/0045 370/474 |

(Continued)

FOREIGN PATENT DOCUMENTS

EP 2017988 A1 1/2009

OTHER PUBLICATIONS

U.S. Appl. No. 13/836,983, Final Office Action dated Sep. 10, 2015.
(Continued)

*Primary Examiner* — Charles C Jiang
*Assistant Examiner* — Kyaw Z Soe
(74) *Attorney, Agent, or Firm* — Leber IP Law; David C. Robertson

(57) ABSTRACT

A frame delineation method for a generic framing procedure (GFP) that includes: searching a serial data stream comprising GFP frames, octet by octet, to identify an eight octet sequence; and delineating GFP frames from the serial data stream in response to determining that a first group of four octets of the identified eight octet sequence comprises a valid Core Header, and in response to determining that a second group of four octets of the identified eight octet sequence comprises one of a valid Core Header and a valid descrambled Type Header.

12 Claims, 11 Drawing Sheets

(56) References Cited

U.S. PATENT DOCUMENTS

2008/0267281 A1* 10/2008 Costantini ............ H03M 13/09
375/240

OTHER PUBLICATIONS

U.S. Appl. No. 13/836,983, Non-Final Office Action dated Jan. 16, 2015.
U.S. Appl. No. 13/836,983, Notice of Allowance dated Jan. 22, 2016.
U.S. Appl. No. 14/277,823, Non Final Office Action dated Oct. 6, 2016.
U.S. Appl. No. 14/277,823, Notice of Allowance dated Apr. 20, 2017.

* cited by examiner

FRAME DELINEATION METHOD FOR A GENERIC FRAMING PROCEDURE

CROSS REFERENCE TO RELATED APPLICATIONS

This application is a continuation of U.S. patent application Ser. No. 14/277,823 filed on May 15, 2014, which is a continuation of U.S. patent application Ser. No. 13/836,983 filed on Mar. 15, 2013, now U.S. Pat. No. 9,344,321, which claim the benefit of priority of U.S. Provisional Patent Application No. 61/682,472 filed Aug. 13, 2012, all of which are incorporated herein by reference.

FIELD

The present disclosure relates generally to frame delineation method for a Generic Framing procedure (GFP)

BACKGROUND

A generic framing procedure (GFP) is used to encapsulate octet-aligned, variable-length payloads from higher-level client signals for subsequent mapping into octet-synchronous payload envelopes. An example of the GFP is described in ITU-T G.7041 standard.

A block diagram of a GFP frame 100 as specified in the ITU-T G.7041 standard is shown in FIG. 1. The GFP frame 100 includes a Core Header 102 that has a length of four octets, and a variable length payload area 104 that may include four (4) to sixty-five thousand five hundred and thirty five (65 535) octets. The Core Header 102 includes a two octet (16-bit) payload length indicator (PLI) field 106, and a two octet Core Header Error Control (cHEC) field 108 that contains a cyclic-redundancy-check (CRC-16). The variable length payload area 104 includes a payload header 110 that has a variable length of four (4) to sixty-four (64) octets, a client payload information field 112, and an optional payload frame check sequence (FCS) 114.

The payload header 110 includes a four octet Type Header 116 and a variable number of additional payload header fields, referred to as a group as the optional Extension Header 118. The optional Extension Header 118 may include zero (0) to sixty (60) octets. The Type Header 116 includes a two octet Type Header field and a two octet Type Header Error Control field. The two octet Type Header field includes a three-bit Payload Type Identifier (PTI) 120, a one-bit Payload FCS Indicator (PFI) 122, a four-bit Extension Header Identifier (EXI) 124, and an eight-bit User Payload Identifier (UPI) 126. The two-octet Type Header Error Control field includes a CRC-16 generated sequence 128 that protects the integrity of the contents of the Type Header field by enabling both single-bit error correction and multi-bit error detection, as outlined in the ITU-T G.7041 standard, which is incorporated herein by reference.

Referring to FIG. 2, a block diagram of a state machine 200 for a GFP frame delineation method in accordance with the ITU-T G.7041 standard prior to August 2012 (hereinafter referred to as "the original GFP frame delineation method") is shown. The original GFP frame delineation method is performed in relation to the state diagram of FIG. 2 and is based on the correlation between the first two octets of the GFP frame 100 and the embedded two-octet cHEC field 108. The state diagram of FIG. 2 works in the following manner.

In the HUNT state 202, the original GFP frame delineation method performs a frame alignment search by searching, octet by octet, for a Core Header 102 over the last received sequence of four octets. Core Header correction is disabled while in this state. During the HUNT state 202, a group of four octets is considered to be a candidate Core Header 102 when, after Barker decoding, the value in the last two octets of the group represents a correct CRC-16 over the value in the first two octets of the group. At this point a candidate Core Header 102 of a candidate GFP frame is identified and the method enters the PRESYNC state 204.

In the PRESYNC state 204, the original GFP method performs frame delineation by checking for a correct cHEC match in the Core Header 102 of the next candidate GFP frame 100. The PLI field 106 in the Core Header 102 of the preceding GFP frame 100 (i.e. the candidate GFP frame identified in the HUNT state 202) is used to locate the beginning of the next candidate GFP frame 100. Core Header correction is disabled while in the PRESYNC state 204. The method repeats until a predetermined number (DELTA) of consecutive correct cHECs are confirmed, at which point the method enters the SYNC state 206. If one incorrect cHEC is detected, the method returns to the HUNT state 202. The total number of consecutive correct cHECs required to move from the HUNT state 202 to the SYNC state 206 is therefore DELTA+1.

It is noted that robustness against false delineation in the original frame delineation method depends on the value of the parameter, DELTA. DELTA is selected to make the original GFP frame delineation method robust, with reasonable hardware complexity. For example, a value of DELTA=1 is suggested to achieve sufficient robustness, with reasonable hardware complexity.

In the SYNC state 206, the original GFP method performs frame delineation by checking for a correct cHEC match on the next candidate GFP frame 100. The PLI field in the Core Header 102 of the preceding GFP frame is used to find the beginning of the next candidate GFP frame 100. Single-bit Core Header correction is enabled while in this state. Frame delineation is lost whenever multiple bit errors are detected in the Core Header 102 by the cHEC. In this case, a GFP Loss of Synchronization event is declared and the method returns to the HUNT state 202.

The GFP frame recovery state machine 200 for the original GFP frame delineation method described above and shown in FIG. 2 relies exclusively on GFP Core Headers 102 to delineate GFP frames from a serial data stream comprising GFP frames. Specifically, once a candidate Core Header 102 is found (i.e. a four-octet pattern with the last two octets representing a valid CRC-16 over the first two octets), the first two octets are regarded as a candidate Payload Length Indicator (PLI) 106. If this candidate Core Header 102 is an actual Core Header 102, the Core Header 102 for the next GFP frame 100 will appear immediately after the end of the current GFP frame 100, as indicated by the candidate PLI 106. The original GFP frame delineation method must therefore wait until this next location of a GFP Core Header 102 to determine whether the current candidate Core Header 102 may be regarded as an actual Core Header 102.

While the original GFP frame delineation method shown represented by the state diagram of FIG. 2 may be repeated through a chain of candidate Core Headers 102 for additional robustness, the ITU-T G.7041 standard recommends that a single candidate Core Header 102 that correctly points to a second candidate Core Header 102 is sufficient to enter the SYNC state 206. The M virtual framers 208 shown in the state diagram 200 of FIG. 2 may be used to test for other candidate Core Headers 102 in parallel while waiting to see if the candidate PLI 106 points to a correct Core Header 102.

A reason for relying on the Core Header 102 to delineate GFP frames from a serial data stream comprising GFP frames in the original GFP frame delineation method is that only the Core Header 102 contains bits that are not scrambled with a self-synchronous scrambler that covers the GFP frame payload area 104. A Barker-type code covers the Core Header 102; however, that is a simple exclusive-or (XOR) with a fixed constant pattern that may be removed by a GFP receiver before computing the validity of the CRC-16.

Referring again to FIG. 1, the Type Header 116 has the same length as the Core Header 102, and the Type Header 116 is covered by a CRC-16 that uses the same polynomial as the Core Header 102. If the Type header 116 was not scrambled, the Type Header 116 may be utilized for faster GFP frame delineation, which could potentially eliminate or simplify the PLI-tracking portion of the original GFP frame delineation method. Unfortunately, the Type Header 116 is covered by an $X^{43}+1$ self-synchronous scrambler, which makes each of its bit values dependent on the values of the last GFP data/control/management frame. As such, the $X^{43}+1$ GFP payload descrambler 300 shown in FIG. 3 and described in the ITU-T G.7041 standard is not able to provide any of the information required to descramble the Type Header 116 during a frame alignment search (i.e. the HUNT state 202).

Improvements in frame delineation methods for a GFP are therefore desirable.

BRIEF DESCRIPTION OF THE DRAWINGS

Embodiments of the present disclosure will be described, by way of example, with reference to the drawings and to the following description, in which.

DETAILED DESCRIPTION

Figure 1:
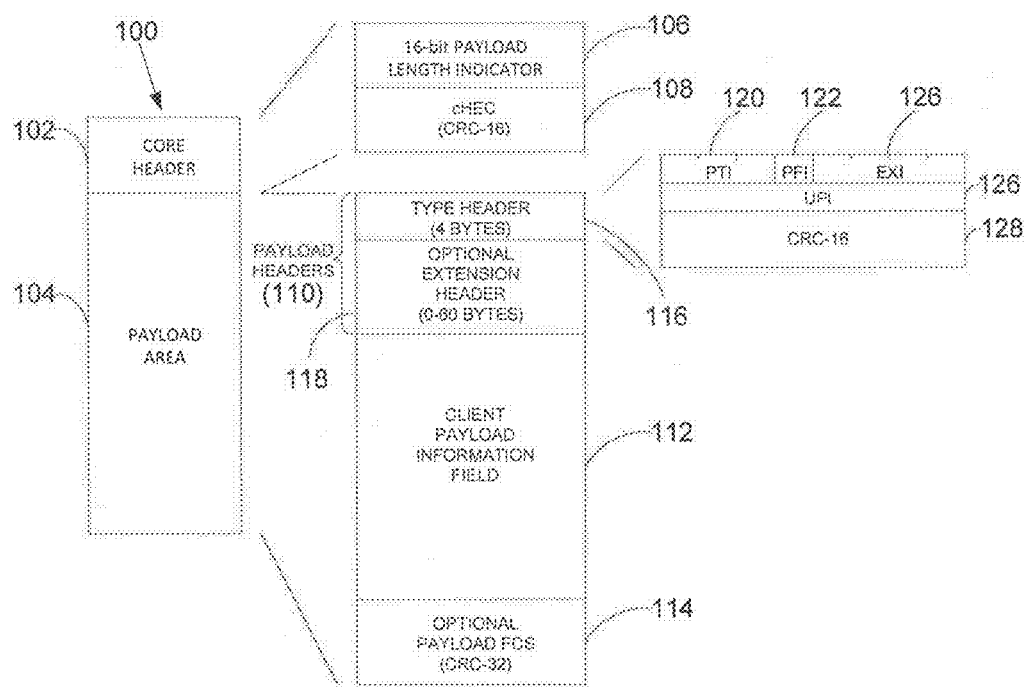
FIG. 1 is a block diagram of a GFP frame in accordance with the ITU-T G.7041 standard.
Figure 2:
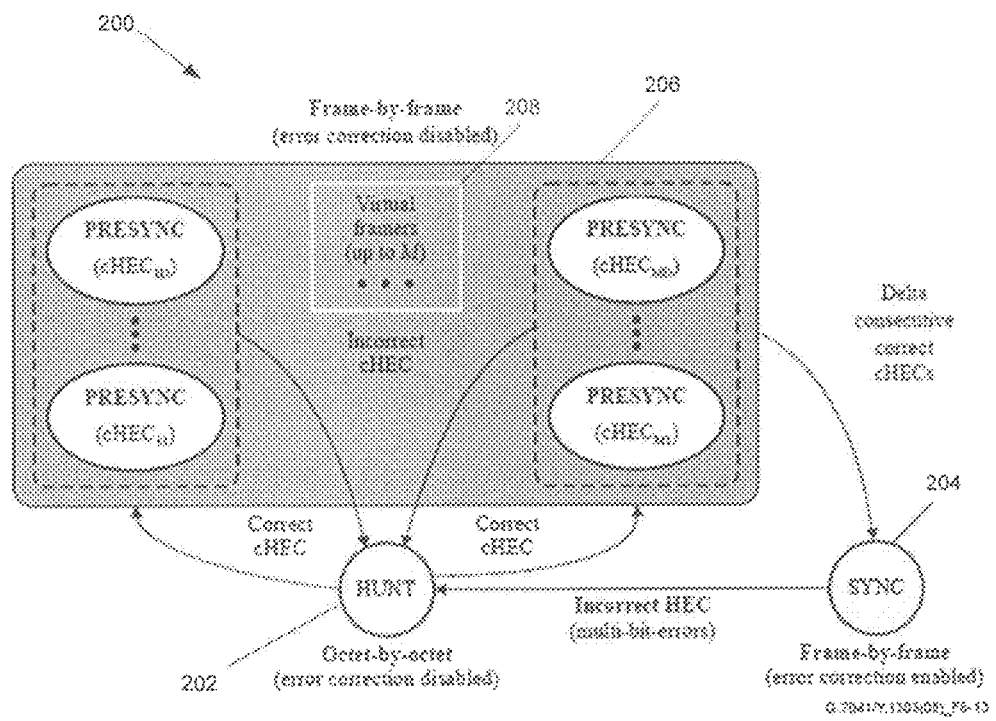
FIG. 2 is a block diagram of a state machine for the original frame delineation method.
Figure 3:
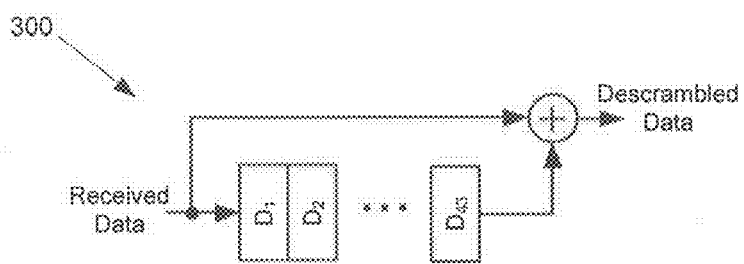
FIG. 3 is a block diagram of a GFP payload descrambler in accordance with the ITU-T G.7041 standard.

According to an aspect of the present disclosure, a frame delineation method for a GFP is provided. The frame delineation method includes: searching a serial data stream comprising GFP frames, octet by octet, for an eight octet sequence; and delineating a GFP frame from the serial data stream in response to determining that a first group of four octets of the eight octet sequence comprises a valid Core Header, and in response to determining that a second group of four octets of the eight octet sequence comprises a valid Core Header or a valid descrambled Type Header.

For the purposes of the present disclosure, the first group of four octets of the eight octet sequence is considered to be a valid Core Header when, after Barker decoding, the value in the last two octets of the first group of four octets of the eight octet sequence represent a correct CRC-16 over the value in the first two octets of the first group of four octets of the eight octet sequence. A second group of four octets of the eight octet sequence is considered to be a valid Core Header when the value in the last two octets of the second group of four octets of the eight octet sequence represents a correct CRC-16 over the value in the first two octets of the second group of four octets of the eight octet sequence. A second group of four octets of the eight octet sequence is considered to be a valid descrambled Type Header when, after descrambling, the value in the last two octets of the second group of four octets of the eight octet sequence represents a correct CRC-16 over the value in the first two octets of the second group of four octets of the eight octet sequence.

In an aspect, the frame delineation method provides determining that a second group of four octets of the eight octet sequence includes one of a second valid Core Header and a valid descrambled Type Header based on a payload length indicator of the first valid Core Header.

In an aspect, the second group of four octets of the eight octet sequence is determined to include a valid second Core Header in response to determining that the payload length indicator of the first valid Core Header is equal to zero.

In an aspect, the second group of four octets of the eight octet sequence includes a valid descrambled Type Header when the payload length indicator of the first valid Core Header is not equal to zero.

In an aspect, the frame delineation method includes, in response to determining that the payload length indicator of the first valid Core Header is not equal to zero, descrambling the second group of four octets of the eight octet sequence based on forty three bits of the serial data stream that immediately precede the eight octet sequence.

In an aspect, descrambling the second group of four octets of the eight octet sequence includes descrambling the second group of four octets of the eight octet sequence utilizing a free-running $X^{75}+1$ self-synchronous descrambler.

In an aspect, descrambling the second group of four octets of the eight octet sequence includes initializing an $X^{43}+1$ GFP payload descrambler utilizing a combination of information from a Type Header of the second group of four octets of the eight octet sequence and eleven bits that immediately precede the eight octet sequence, and descrambling a portion of a payload of a GFP frame that immediately follows the second group of four octets of the eight octet sequence utilizing the $X^{43}+1$ GFP payload descrambler, such that a first GFP frame in the serial data stream is not discarded due to lack of descrambler synchronization.

In an aspect, the present disclosure provides a computer-readable medium having computer-readable instructions executable by at least one processor to perform a frame delineation method as described herein.

According to another aspect of the present disclosure, a frame delineation method for a GFP is provided. The frame delineation method includes searching a serial data stream comprising GFP frames to locate a first GFP frame having a first valid Core Header. In response to determining that a payload length indicator of the first valid Core Header is equal to zero, GFP frames from the serial data stream are delineated based on the first valid Core Header and based on a second Core Header of a second GFP frame when the second Core Header is valid, the second GFP frame immediately following the first GFP frame in the serial data stream. In response to determining that a payload length indicator of the first valid Core Header is not equal to zero, GFP frames from the serial data stream are delineated based on the first valid Core Header and based on a descrambled Type Header of the first GFP frame when the descrambled Type Header is valid.

For the purposes of the present disclosure, the second Core Header of a second GFP frame is valid when, after Barker decoding, the value in the last two octets of the second Core Header represent a correct CRC-16 over the value in the first two octets of the second Core Header. The descrambled Type Header is valid when, after payload area descrambling, the value in the last two octets of the descrambled Type Header represent a correct CRC-16 over the value in the first two octets of the descrambled Type Header.

In an aspect, the frame delineation includes descrambling the Type Header of the second GFP frame based on forty three bits of the serial data stream that immediately precede the first GFP frame.

In an aspect, descrambling the Type Header of the second GFP frame includes descrambling the Type Header of the second GFP frame utilizing a free running $X^{75}+1$ descrambler.

In an aspect, descrambling the Type Header of the second GFP frame includes initializing an $X^{43}+1$ GFP payload descrambler utilizing information from the Type Header of the second GFP frame and the last eleven bits of the first GFP frame, and descrambling a portion of a payload of a third GFP frame that immediately follows the second GFP frame utilizing the $X^{43}+1$ GFP payload descrambler, such that the first GFP frame in the serial data stream is not discarded due to lack of descrambler synchronization.

According to another aspect, the present disclosure is directed to a frame delineation method for a generic framing procedure (GFP), the method implemented using a processor and comprising receiving a serial data stream comprising GFP frames, performing a frame alignment search by searching, octet by octet, the received serial data stream for an eight octet sequence comprising a first group of four octets comprising a valid Core Header, descrambling a second group of four octets of the eight octet sequence based on a plurality of bits of the serial data stream preceding the eight octet sequence, wherein the descrambling is performed during the frame alignment search, and wherein the descrambling is in response to determining that the first group of four octets of the eight octet sequence comprises a valid Core Header and to determining that a payload length indicator of the valid Core Header is not equal to zero, delineating, during the frame alignment search, GFP frames from the received serial data stream in response to determining that the second group of four octets comprises a valid descrambled Type Header.

In an aspect, the frame delineation method comprises delineating, during a frame alignment search, GFP frames from the received serial data stream in response to determining that a first group of four octets of a second eight octet sequence comprises a first valid Core Header and in response to determining that a second group of four octets of the second eight octet sequence comprises a second valid Core Header.

In an aspect, the frame delineation method comprises descrambling the second group of four octets of the eight octet sequence based on forty three bits of the serial data stream that immediately precede the eight octet sequence.

In an aspect, the descrambling is performed using a free-running $X^{75}+1$ self-synchronous descrambler.

In an aspect, the frame delineation method further comprises descrambling, using a $X^{43}+1$ GFP payload descrambler, a portion of a payload of a GFP frame that immediately follows the second group of four octets of the eight octet sequence, and initializing the $X^{43}+1$ GFP payload descrambler utilizing a combination of information from a Type Header of the second group of four octets of the eight octet sequence and eleven bits that immediately precede the eight octet sequence prior to the $X^{43}+1$ descrambler descrambling the portion of a payload of the GFP frame that immediately follows the second group of four octets of the eight octet sequence.

According to another aspect, the present disclosure is directed to a frame delineation method for a generic framing procedure (GFP), the method implemented using a processor and comprising receiving a serial data stream comprising GFP frames, performing a frame alignment search comprising searching the received serial data stream comprising GFP frames to locate a GFP frame having a valid Core Header, descrambling a Type Header of the GFP frame based on a plurality of bits of the serial data stream preceding the GFP frame, wherein the descrambling is performed during the frame alignment search, and wherein the descrambling is in response to determining that a payload length indicator of the valid Core Header is not equal to zero, and delineating, during the frame alignment search, GFP frames from the serial data stream based on the valid Core Header of the GFP frame and based on the descrambled Type Header of the GFP frame when the descrambled Type Header is valid.

In an aspect, the frame delineation method further comprises descrambling the Type Header of the GFP frame based on forty three bits of the serial data stream that immediately precede the GFP frame.

In an aspect, the descrambling is performed using a free running $X^{75}+1$ descrambler.

In an aspect, the frame delineation method further comprises descrambling, using a $X^{43}+1$ GFP payload descrambler, a portion of the GFP frame, and initializing the $X^{43}+1$ GFP payload descrambler utilizing information from the Type Header of the GFP frame and the last eleven bits preceding the GFP frame prior to the $X^{43}+1$ GFP payload descrambler descrambling the portion of a payload of the GFP frame that immediately follows the Type Header of the GFP frame.

According to another aspect, the present disclosure is directed to a frame delineation method for a generic framing procedure (GFP), the method implemented using a processor and comprising receiving a serial data stream comprising GFP frames from a network, serial-to-parallel converting the received serial data stream, performing a frame alignment search comprising reading an eight octet sequence from the serial-to-parallel converted data stream, determining whether a first group of four octets of the eight octet sequence comprises a valid Core Header, when the first group of four octets of the eight octet sequence comprises a valid Core Header, determining a payload length indicator of the valid Core Header, when the payload length indicator is not equal to zero, descrambling a second group of four octets of the eight octet sequence based on a plurality of bits of the serial data stream preceding the eight octet sequence and determining whether the descrambled second group of four octets of the eight octet sequence comprises a valid Type Header, wherein the descrambling is performed during the frame alignment search, delineating, during the frame alignment search, GFP frames from the received serial data stream when the second group of four octets of the eight octet sequence comprises the valid descrambled Type Header.

In an aspect, the descrambling the second group of four octets of the eight octet sequence is based on forty three bits of the serial data stream that immediately precede the eight octet sequence.

In an aspect, the descrambling is performed using a free running $X^{75}+1$ descrambler.

Embodiments of the present disclosure generally relate to an improved frame delineation method for a GFP described in the ITU-T G.7041 standard.

A GFP Type Header 116 potentially contains useful information for frame delineation. GFP payload area scrambling, however, precludes direct use of the GFP Type Header 116 for frame delineation. The ITU-T G.7041 standard specifies that the payload descrambler is disabled (i.e. freezes its state) during a frame alignment search (i.e. the HUNT state 202). If a descrambler at a GFP receiver were allowed to free-run during an initial frame alignment search (i.e. the Hunt state 202), the descrambler would also contain bits from the Core Header 102 that precedes the Type Header 116. As such, the payload descrambler described in the ITU-T G.7041 standard cannot be used to descramble the Type Header 116 in a frame alignment search (i.e. the HUNT state 202). The original GFP frame delineation method may be modified to allow use of the Type Header 116 in the frame alignment search (i.e. the HUNT state 202) as further described below.

The ITU-T standard G.7041 states that the detection of two consecutive valid Core Headers 102 is sufficient for frame delineation. Because the Type Header 116 is the same length as the Core Header 102 and uses the same type of CRC-16 as the Core Header 102, it is equivalently robust to find a valid Core Header 102 followed by a valid Type Header 116. Consequently, when a valid Core Header 102 is found, the valid Core Header 102 is either:

(a) the valid Core Header 102 of a GFP Idle frame 100 that is followed immediately by another Core Header 102 of the next GFP frame 100;
(b) the valid Core Header of a non-Idle GFP frame 100 that is followed immediately by a Type Header 116 of the current non-Idle GFP frame 100.

In case (a), no payload exists, and therefore no descrambling is required. In case (b), two sub cases exist:
(b1) a frame alignment search identifies the valid Core Header before receiving at least forty three (43) bits of a previous non-Idle GFP frame 100. In this sub case, not enough information (i.e. GFP frame payload bits from previous non-Idle GFP frame) exists to descramble the Type Header 116;
(b2) a frame alignment search identifies the valid Core Header 102 after receiving at least forty three (43) bits of a previous non-Idle GFP frame 100. In this case, enough information exists to descramble the Type Header 116 and determine if the Type Header 116 is valid.

In sub case (b1), a frame alignment search identifies a valid Core Header 102 before the Type Header descrambler can buffer the information that is required for descrambling the Type Header 116. Consequently, the Type Header 116 cannot be used for frame delineation, and the frame alignment search must search for the next valid Core Header 102. If the next valid Core Header 102 is a valid Core Header of a non-idle GFP frame 100, the Type Header descrambler will have buffered the required information for correct descrambling of the Type Header 116. If the next valid Core Header 102 is a valid Core Header 102 of an idle GFP frame 100, no descrambling is required, as outlined in case (a) above. Since the original GFP frame delineation method described must always wait until this subsequent valid Core Header is identified 102, the performance of the frame delineation method of the present disclosure is not degraded in relation to the performance of the original GFP frame delineation method.

In sub case (b2), the implication is that a non-Idle GFP frame 100 precedes a valid Core Header 102. Consequently, the forty three (43) bits that preceded the valid Core Header 102 is the information required to correctly descramble the Type Header 116.

In both sub case (b1) and sub case (b2), a GFP receiver may make the decision regarding frame delineation by examining a sixty-four (64) bit continuous block of data. Consequently, in contrast to the original GFP frame delineation method, the frame delineation method of the present disclosure only utilizes the PLI to identify whether the first valid Core Header 102 is a GFP Idle frame 100.

The original GFP frame delineation method is well suited for hardware implementations where consecutive data bits are transported in parallel on a data bus with data bus widths of up to thirty-two bits. When a candidate Core Header 102 is identified in such hardware implementations, the next Core Header 102 will always be found in a subsequent bus word (all the parallel data bits entering or exiting the data bus at the same time). When the data bus width exceeds thirty-two bits, the next Core Header 102 may be completely contained within the same bus word as the end of the candidate Core Header 102. For example, if the Candidate Core Header 102 is a GFP Idle Frame 100 (i.e. a GFP frame that consists of only a Core Header 102, with a PLI=0), the next Core Header 102 will begin immediately after the GFP Idle Frame 100. When the bus width exceeds sixty-four (64) bits, the next Core Header 102 may be completely contained in the current data bus word even if the current candidate Core Header 102 is not a GFP Idle Frame 100.

Figure 4:
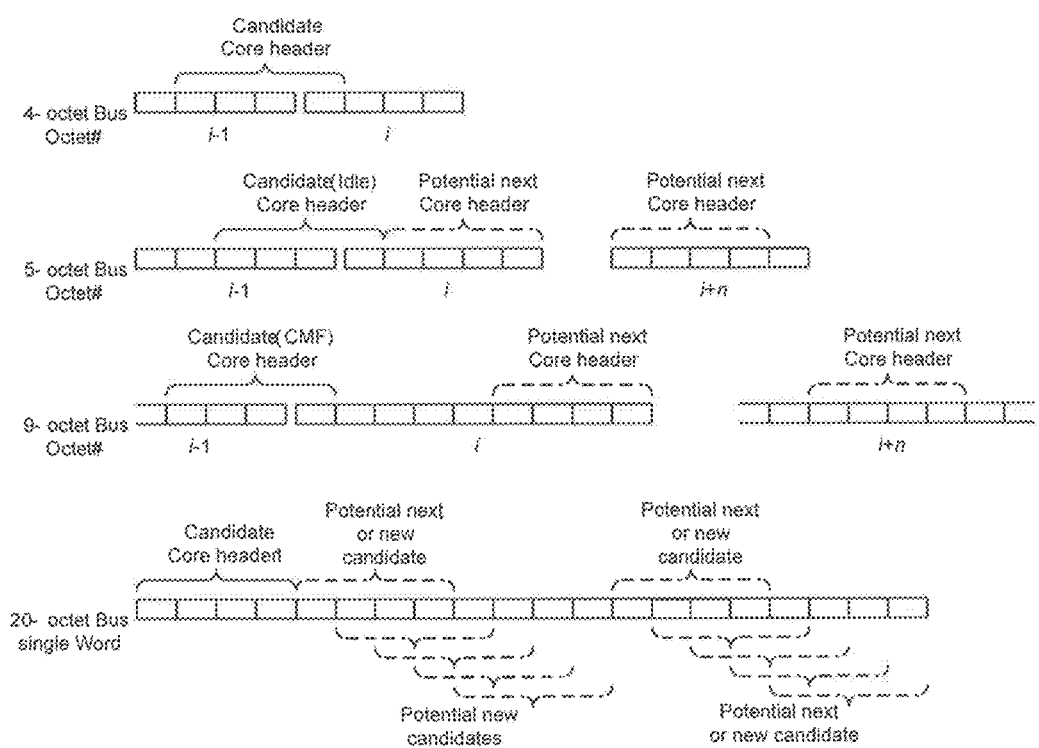
FIG. 4 is a block diagram illustrating Core Header locations within data buses having widths of four-octets, five-octets, nine-octets, and twenty-octets.

Referring to FIG. 4, examples of Core Header locations within data buses having widths of four-octets, five-octets, nine-octets, and twenty-octets are shown. As illustrated in the data buses having a twenty-octet width (i.e. the data bus at the bottom of—FIG. 4), the number of potential candidate Core Headers 102 increases as the data bus width increases.

Integrated circuits for ITU-T G.709 Optical Transport Network (OTN) interfaces use increasingly wider buses for higher data rate interfaces to keep the on-chip data bus clock rates within technological limits. Presently, the highest OTN data rate is for the Optical Data Unit level 4 (ODU4), which has nominal data rate of 104.8 Gbit/s. OTN interface data rates of approximately 400 Gbit/s and 1000 Gbit/s are expected in the future. Consequently, the number of frame alignment search permutations that can occur within a data bus word becomes an increasing issue, and is further complicated by the high data rates of present OTN interfaces.

High-speed/wide-bus implementations may be simplified if a GFP framer is not required to track the candidate Core header PLI values in its frame alignment search (i.e. the HUNT state 202).

Figure 5:
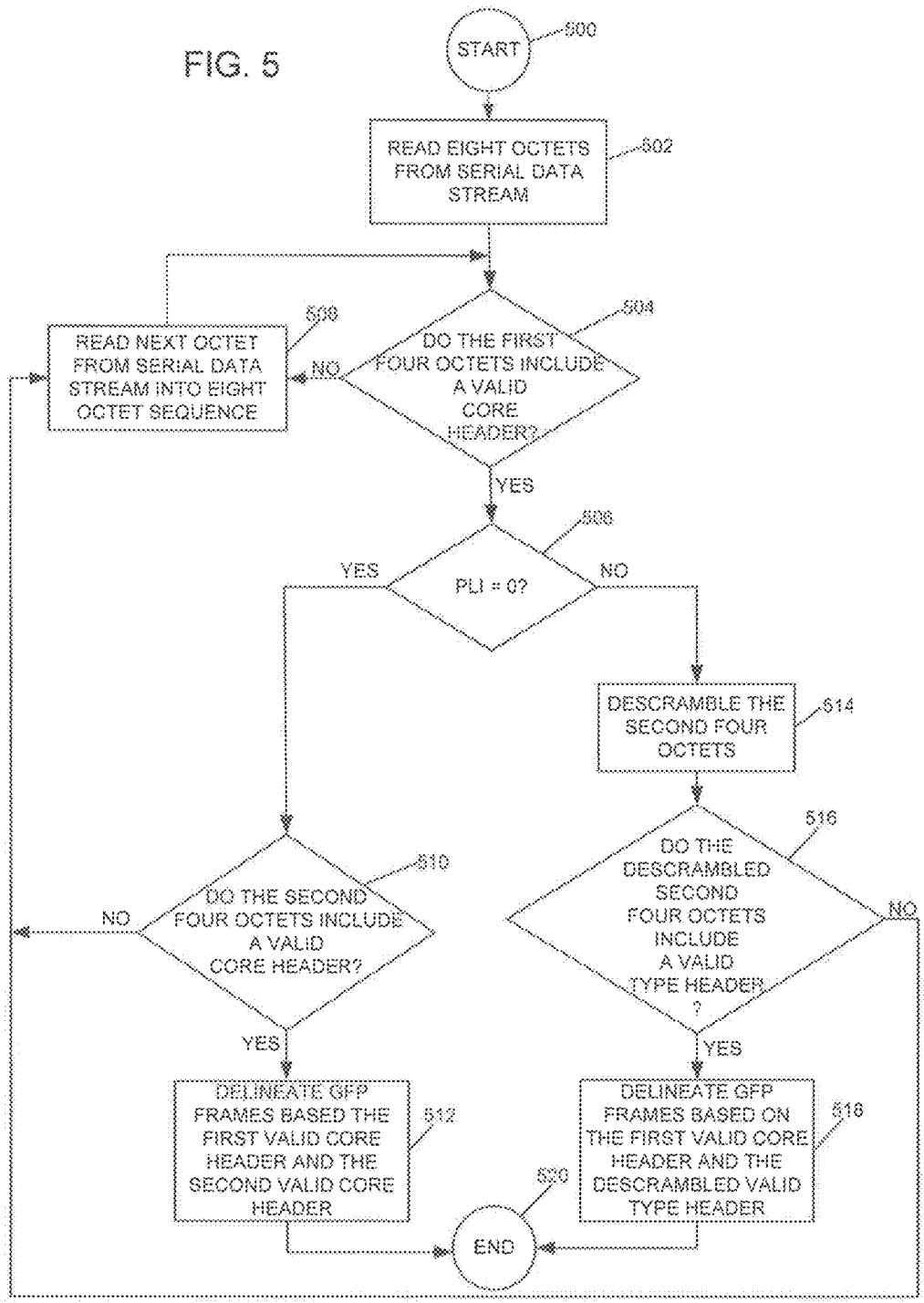
FIG. 5 is a flowchart illustrating a GFP frame delineation method for the GFP in accordance with an embodiment of the present disclosure.

A flowchart illustrating a frame delineation method for a GFP in accordance with the present disclosure is shown in FIG. 5. The method may be carried out by software executed, for example by, a processor of a GFP receiver. Coding of software for carrying out such a method is within the scope of a person of ordinary skill in the art given the present description. The method may contain additional or fewer processes than shown and/or described. Computer-readable code executable by at least one processor of a GFP receiver to perform the method may be stored in a computer-readable medium. Alternatively, the method may be carried out by custom logic that is implemented in a field programmable gate array (FPGA) or an application specific integrated circuit (ASIC)

The frame delineation method of the present disclosure begins at 500. A serial data stream containing GFP frames is searched, octet-by-octet, for an eight octet sequence. The serial data stream is searched by reading 502 eight octets from the serial data stream into a buffer, such as a shift register. After an eight octet sequence is read 502 into, for example, a shift register, the frame delineation method determines 504 if the first four octets of the eight octet sequence includes a valid first Core Header. As mentioned above, the first four octets of the eight octet sequence includes a valid first Core Header when, after Barker decoding, the value in the last two octets of the first four octets of the eight octet sequence represent a correct CRC-16 over the value in the first two octets of the first four octets of the eight octet sequence.

If the first four octets of the eight octet sequence include a valid first Core Header, the frame delineation method determines 506 the PLI of the valid first Core Header. If the first four octets of the eight octet sequence do not include a valid first Core Header, the frame delineation method reads 508 the next octet from the serial data stream into the eight octet sequence, and again determines 504 if the first four octets of the eight octet sequence include a valid first Core Header as described above.

If the PLI of the valid first Core Header is determined 506 to equal to zero, the frame delineation method proceeds to determine 510 if the second four octets of the eight octet sequence includes a second valid Core Header. As mentioned above, the second four octets of the eight octet sequence includes a valid second Core Header when, after Barker decoding, the value in the last two octets of the second four octets of the eight octet sequence represent a correct CRC-16 over the value in the first two octets of the second four octets.

If the second four octets of the eight octet sequence are determined 510 to include a second valid Core Header, the frame delineation method of the present disclosure proceeds to delineate 512 GFP frames from the serial data stream. If the second four octets of the eight octet sequence is determined 510 to not include a second valid Core Header, the frame delineation method of the present disclosure returns to 508 to read the next octet from the serial data stream into the eight octet sequence.

If the PLI of the valid first Core Header is determined 506 to not be equal to zero, the frame delineation method proceeds to descramble 514 the second four octets of the eight octet sequence. The second four octets of the eight octet sequence are descrambled, as described further below with respect to FIG. 7A, FIG. 7B and FIG. 8. After the second four octets of the eight octet sequence are descrambled 514, the frame delineation method determines 516 if the descrambled second four octets of the eight octet sequence include a valid Type Header. As mentioned above, the second four octets of the eight octet sequence is considered to be a valid descrambled Type Header when, after descrambling, the value in the last two octets of the second four octets of the eight octet sequence represents a correct CRC-16 over the value in the first two octets of the second four octets of the eight octet sequence.

If the descrambled second four octets of the eight octet sequence are determined 516 to include a valid Type Header, the frame delineation method of the present disclosure delineates 518 GFP frames from the serial data stream. If the descrambled 514 second four octets of the eight octet sequence is determined to not include a valid Type Header, the frame delineation method of the present disclosure returns to 508 to read the next octet from the serial data stream into the eight octet sequence.

Once the GFP frames are delineated 512, 518 from the serial data stream, the frame delineation method of the present disclosure ends 520.

Figure 6:
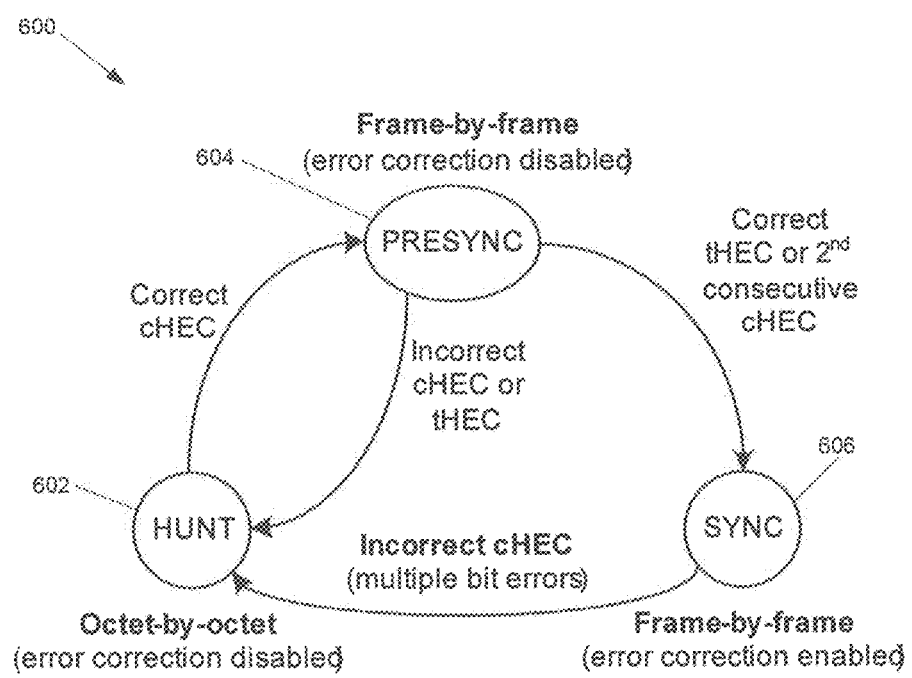
FIG. 6 is a block diagram of a state machine for the GFP frame delineation method of FIG. 5.

FIG. 6 illustrates a state diagram 600 for the GFP frame delineation method illustrated in FIG. 5. In FIG. 6, the terms "cHEC" and "tHEC" refer to the CRC-16 Header error checks for the Core Header and the Type Header, respectively. The state diagram works in the following manner.

In the HUNT state 602, the method of an embodiment of the present disclosure performs frame delineation by searching, octet-by-octet, for a valid Core Header over the last received sequence of four octets. Core Header error correction is disabled while in this state. During the HUNT state 602, a group of four octets is considered to be a valid Core Header when, after Barker decoding, the value in the last two octets represents a correct CRC-16 over the value in the first two octets. Once a correct cHEC match is detected in the Core Header PLI and cHEC fields, a GFP frame is identified and the method enters the PRESYNC state 604.

It is noted that in a wide data bus application, such as an application in which the width of the data bus exceeds sixty-four bits, the octet-by-octet aspect of the HUNT state 602 refers to searching each of the octet alignment positions within the bus word. The frame delineation method of an embodiment of the present disclosure requires N parallel Hunt State 602 searches for an N-byte data bus.

In the PRESYNC state 604, the GFP method of the embodiment of the present disclosure checks the PLI of the valid Core Header 102 of the preceding GFP frame 100. When the PLI is zero, the next GFP frame includes a Core Header 102 that immediately follows the valid Core Header 102 of the preceding GFP frame 100. The GFP method performs frame delineation by checking for a correct cHEC match in the Core Header 102 of the next GFP frame 100. The method enters the SYNC state 606 when the Core Header 102 of the next GFP frame 100 has a correct cHEC (i.e. the Core Header 102 is a valid Core Header 102). If the Core Header 102 of the next GFP frame 100 has an incorrect cHEC (i.e. the Core Header 102 is not a valid Core Header 102), the method returns to the HUNT state 602.

When the PLI is not zero in the valid Core Header 102 that caused the transition to the PRESYNC state 604, the current GFP frame 100 includes a Type Header 116 that immediately follows the valid Core Header 102 of the current GFP frame 100. The GFP framing method in the embodiment of the present disclosure performs frame delineation by first descrambling the Type Header 116 (as described below with reference to FIG. 7), and then checking for a correct tHEC match in the Type Header 116 of the current GFP frame. The method enters the SYNC state 606 when the Type Header 116 of the current GFP frame 100 has a correct tHEC (i.e. the Type Header 116 is a valid Type Header 116). If the Type Header 116 of the current GFP frame 100 has an incorrect tHEC, the method returns to the HUNT state 602.

In the SYNC state 606, the GFP method performs frame delineation by checking for a correct cHEC match in the next GFP frame 100. The PLI field in the Core Header 102 of the preceding GFP frame 100 is used to determine the location of the current Core Header 102. Single-bit Core Header correction is enabled while in this state. Frame delineation is lost whenever multiple bit errors are detected in the Core Header 102 by the cHEC (i.e. the Core Header 102 is not a valid Core Header 102).

As previously described, the $X^{43}+1$ GFP payload descrambler 300 described in the ITU-T standard G.7041 is enabled only during payload bits (i.e. the bits between the end of a Core Header 102 and the end of a GFP frame 100), and the GFP payload descrambler 300 freezes its state during Core Headers 102. The $X^{43}+1$ GFP payload descrambler 300 is also disabled (i.e. frozen) when the framer is in the PRESYNC state 204 or the HUNT state 202. If the $X^{43}+1$ GFP payload descrambler 300 described in the ITU-T standard G.7041 is allowed to free-run during an initial frame alignment search, the $X^{43}+1$ GFP payload descrambler 300 would contain bits from the valid Core Header 102 that precedes the Type Header 116. This would cause incorrect descrambling of the Type Header 116.

In order to correctly descramble the Type Header 116, a GFP framer must store the payload bits of a previous GFP frame 100 to descramble the Type Header 116 of the current GFP frame 100. Specifically, these payload bits are the last forty-three (43) payload bits of the previous non-Idle GFP frame 100. According to an embodiment of the present disclosure, the process of storing the payload bits of the previous non-Idle GFP frame 100 required for proper descrambling of the Type Header 116 may be performed utilizing a separate type of free-running synchronous descrambler, which is described further below with respect to FIG. 7A and FIG. 7B. The Type Header 116 is utilized for frame delineation when a GFP framer encounters back-to-back non-Idle GFP frames 100. Consequently, the thirty-two (32) bits of the valid Core Header 102 are located between the payload bits of the previous GFP frame 100 and the Type Header 116 of the current non-idle GFP frame 100. Thus, the information required to descramble the first bit of the Type Header 116 precedes the first bit by 43+32=75 bits in the serial data stream.

Figure 7A:
FIG. 7A and FIG. 7B are block diagrams of a GFP payload descrambler in accordance with an embodiment of the present disclosure.
Figure 7B:
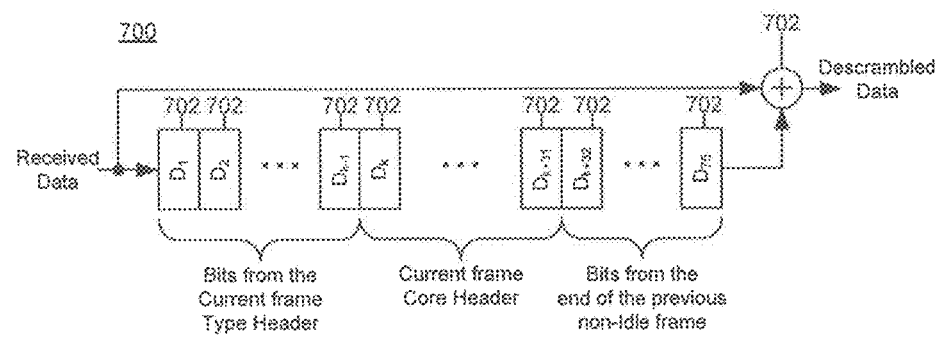

Referring to FIG. 7A, a block diagram of a free-running $X^{75+1}$ GFP payload descrambler 700 that may be utilized to descramble the Type Header 116 when a GFP framer (not shown) needs to descramble the Type Header 116 during back-to-back non-Idle GFP frames 100 is shown. FIG. 7B shows the same descrambler as in FIG. 7A, with a Core Header 102 residing within the descrambler 700.

The term "free running" is utilized herein to mean that the GFP payload descrambler 700 runs continuously over all bits rather than having its state frozen during the stream bits that are not GFP frame payload bits. The $X^{43}+1$ GFP payload descrambler 300 described in the ITU-T standard G.7041 only operates during the payload portion of the GFP frames 100 and has its state frozen during the GFP Core Header bits.

In general, an $X^n+1$ scrambler modifies each bit of its output data for the relevant data stream by performing an Exclusive OR (XOR) operation between that bit and the original unscrambled relevant data stream bit that preceded it by n-bits. In the case of the GFP $X^{43}+1$ scrambler described in the ITU G.7041 standard, the relevant data stream is the GFP payload bits (i.e., by freezing the scrambler state during the Core Header 102, the Core Header bits are completely ignored by the scrambler). An $X^n+1$ descrambler reverses this operation on the relevant data stream by performing an XOR operation on each bit with the received bit that preceded it by n-bits. The free-running $X^{75+1}$ GFP payload descrambler 700 shown in FIG. 7A and FIG. 7B includes seventy-five (75) serially connected flip-flops $D_1, \ldots, D_{75}$ and an adder 702 that performs an XOR logic function. As described above and illustrated in FIG. 7B, when the $X^{75+1}$ GFP payload descrambler 700 contains a thirty-two (32) bit Core Header between two non-Idle GFP frames 100, the payload bits in the descrambler that arrived after the Core Header 102 had been XORed by the $X^{43}+1$ scrambler with data bits that preceded them by 43+32=75 bits.

As illustrated in FIG. 7B, the Core Header 102 resides within the descrambler 700 when the GFP framer needs to descramble the Type Header 116 during back-to-back non-Idle GFP frames 100. These Core Header bits would only affect bits in the current GFP frame 100 that begins thirteen (13) bits after the Type Header 116. This is not an issue for the following two reasons. First, the subsequent payload bits are not used in the frame delineation method of an embodiment of the present disclosure. Second, if the Type Header 116 is a valid Type Header 116, correct frame delineation is declared (i.e. the SYNC state 606 of FIG. 6 is reached), and the $X^{43}+1$ GFP payload descrambler 300 described in the ITU-T G.7041 standard may be utilized in further frame delineation.

As the GFP payload descrambler 700 of an embodiment of the present disclosure is only used during a frame alignment search (i.e. the PRESYNC state 604) and is limited in its application to the case of back-to-back non-Idle GFP frames 100, the state of the payload descrambler of the present disclosure is not required to be frozen during non-payload bits. In other words, the GFP payload descrambler 700 may free-run, and thus, is simpler to implement than the GFP payload descrambler 300 specified in the ITU-T standard G.7041.

Because the ITU-T standard G.7041 specifies that the GFP payload descrambler 300 is disabled during a frame alignment search (i.e. the HUNT state 202 and PRESYNC state 206), the first non-Idle GFP frame 100 after reaching the SYNC state 206 contains errors due to the payload descrambler 300 containing incorrect values. In an alternative embodiment of the present disclosure, when the Type Header 116 is used for GFP frame delineation, a descrambler 800 shown in FIG. 8 is utilized to descramble the Type Header 116.

The descrambler 800 includes an $X^{75}+1$ GFP payload descrambler 810, a regular $X^{43}+1$ GFP payload descrambler 820 connected to the $X^{75}+1$ descrambler 810, load enable logic 830 connected to the regular GFP payload descrambler 820, and shift enable logic 840 connected to the regular $X^{43}+1$ GFP payload descrambler 820. The regular $X^{43}+1$ GFP payload descrambler is similar to the $X^{43}+1$ GFP payload descrambler 300 described above.

When the descrambler 800 is used to descramble the Type Header 116, the $X^{75}+1$ GFP payload descrambler 810 contains the bits that are required to correctly descramble the first eleven (11) payload bits after the Type Header 116. After the first eleven (11) bits, we are at the point of forty-three (43) bits after the valid Core Header 102. Consequently, the current Type Header 116 contains the bits required for continuing the descrambling. Pre-loading the regular $X^{43}+1$ GFP payload descrambler 820 (i.e. the GFP payload descrambler that is utilized after the SYNC state 606 has been entered) with the appropriate bits from the frame search descrambler 810, including the current Type Header 116 allows the first non-Idle GFP frame 100 to be correctly descrambled rather than being discarded as is inherently required by the original frame delineation method. Specifically, the load enable control logic 830 triggers preloading of the regular $X^{43}+1$ GFP payload descrambler 820 with bits $D_1$-$D_{k-1}$ and $D_{k+32}$-$D_{75}$ of the $X^{75}+1$ GFP payload descrambler 810, where the value of "k" corresponds to the point at which the $X^{43}+1$ GFP payload descrambler 820 is enabled. For example enabling the regular $X^{43}+1$ GFP payload descrambler 820 immediately after the Type Header 116 (i.e. immediately after confirmation that this is a valid Type Header 116) would correspond to k=33.

Figure 8:
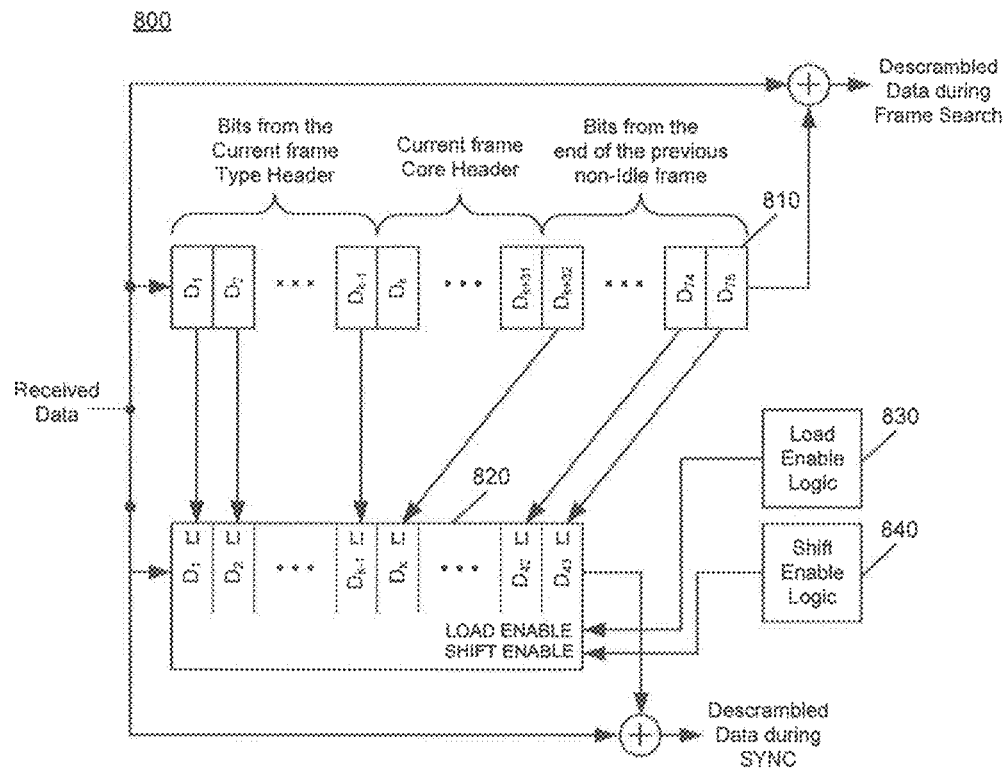
FIG. 8 is a block diagram of a GFP payload descrambler in accordance with another embodiment of the present disclosure.

In the embodiment shown in FIG. 8, shift enable logic 840 is utilized to freeze the regular $X^{43}+1$ GFP payload descrambler 820 during the HUNT 602 and PRESYNC 604 states, and during normal operation in the SYNC state 606, whenever a Core Header 102 is received.

A possible challenge with utilizing the free-running $X^{75}+1$ GFP payload descrambler GFP 700 in the frame delineation method of an embodiment of the present disclosure to obtain the data required for Type Header descrambling would be if the preceding non-Idle GFP frame 100 contained less than the forty-three (43) payload bits needed for correct Type Header descrambling in the current frame. None of the current GFP client payload signals allow such short frames. A GFP Client Management Frame (CMF), such as the Client Signal Fail, may consist of just a Core Header 102 and Type Header 116, and hence contains only thirty-two (32) payload bits (i.e., its Type Header 116). In practice, however, this is not a significant problem. The scenarios in which CMFs are transmitted are Client Signal Fail and communicating client defect information. In these cases, the ITU G.7041 standard specifies that the CMFs are transmitted on an interval of T, with 100 ms≤T≤1000 ms. This restriction is introduced in order to prevent overwhelming the receiver's CMF processor with a steady stream of the same messages. Consequently, there are many GFP Idle frames 100 between each CMF and the GFP framer will recover synchronization on the two GFP idle frames 100 that immediately follow the CMF. The same restriction has always been assumed for the Management Communication Frames (MCFs).

Advantageously, the frame delineation method of an embodiment of the present disclosure eliminates the need to follow the PLI to check the predicted next Core Header locations. By eliminating the need to follow the PLI to check the predicted next Core Header locations, the following net recovery speed up may be achieved, where $p_i$ is the probability that the Core Header corresponds to a GFP Idle frame:

$$\text{Speed Up} \approx \frac{4 \text{ Bytes}}{4 \text{ Bytes} + (1 - p_i)(Ave.\text{ data frame length})}$$

The net frame recovery speed up may be described as the ratio of the frame recovery times of the frame delineation method of an embodiment of the present disclosure to the frame recovery times of the original GFP frame delineation method.

Also, in an embodiment the frame delineation method for a GFP of the present disclosure removes the need for virtual framers. A virtual framer is utilized in the original GFP frame delineation method to reduce the search time penalty associated with waiting to find the predicted next Core Header. In the original GFP frame delineation method, if the current candidate Core Header is not an actual Core Header in the original GFP frame delineation method, this will be unknown to the GFP framer until after a GFP receiver has arrived at the next Core Header location predicted by that candidate PLI. As such, continuing to search for additional candidate Core Headers while the GFP framer waits to confirm the current candidate Core Header is an actual Core Header may reduce the recovery time.

Because the frame delineation method for the GFP of the present disclosure eliminates the need to use the PLI for Core Headers of non-idle GFP frames 100, the virtual frames may be eliminated.

Virtual framers are not be confused with the multiple framers that would be used to search all the different octet alignments of a bus word to detect the location of a candidate Core Header in the original GFP frame delineation method. The virtual frames specified in the ITU-T G.7041 standard for the original frame delineation method are all independent framers, with each existing to follow a different Core Header PLI chain based on starting with a different candidate Core Header. The term PLI chain is utilized herein to refer to a sequence of Core Headers each pointed to by the PLI of the previous Core Header.

The virtual framers described in the ITU-T G.7041 standard allow independent frame searches to continue in the event that one framer has found a false candidate and must wait until it reaches the location specified by the false PLI before determining that the candidate Core Header is a false candidate. Conversely, the multiple framers examining a wide bus word (i.e. a data bus with a bus width that is greater than thirty-two bits) are inherently required with a wide bus in order to perform a parallel search with the bus word of all the different octet alignment positions with the bus word; these are not "virtual" framers, but inherently required real framers. With the original GFP frame delineation method, these bus word parallel framers would not be independent (i.e. not virtual framers), but would require a rather complex interconnection in order to cover the event that the PLI of one candidate Core Header pointed to the Core Header identified by another one of the parallel framers within that bus word. This complexity would be significantly increased for the original GFP frame delineation method if a wide bus implementation additionally used virtual framers associated with each of the bus word parallel framers.

In contrast, the frame delineation method of an embodiment of the present disclosure effectively eliminates the complex interconnection between the parallel framers because each framer is only looking at a sixty four (64) bit block with no PLI chain to follow.

Figure 9:
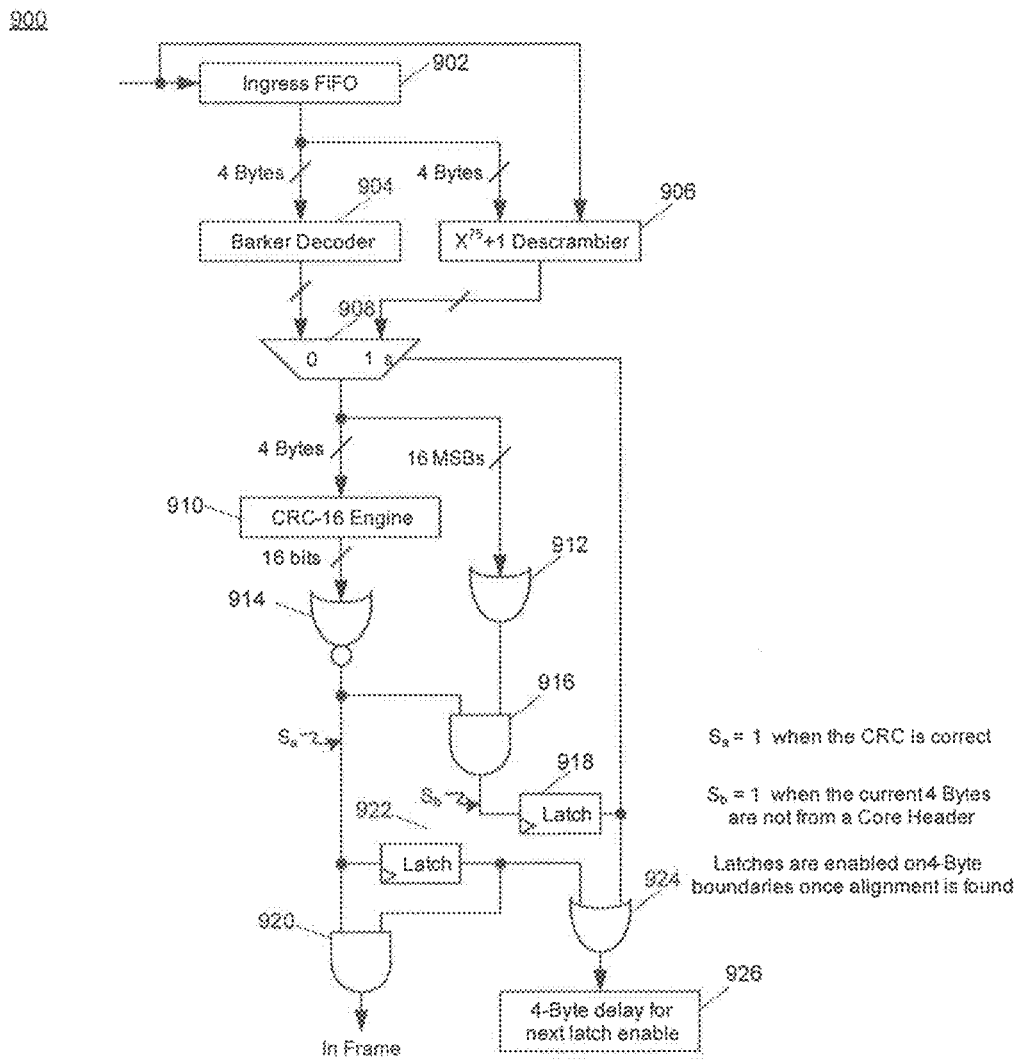
FIG. 9 is a logic block diagram of an example embodiment of hardware for implementing the frame delineation method of the present disclosure.

Referring to FIG. 9, an example of logical block diagram of hardware 900 that implements the frame delineation method of the present disclosure is shown. The hardware implementation shown in FIG. 9 is optimized to minimize circuitry by sharing the same CRC-16 engine for all header checks.

The hardware 900 shown in FIG. 9 includes an ingress first-in-first-out (FIFO) serial-to-parallel converter 902. An output of the serial-to-parallel converter 902 is connected to an input of a Barker decoder 904 and an input of an $X^{75}+1$ descrambler 906. An output of the Barker decoder 904 and an output of the $X^{75}+1$ descrambler 906 are each connected to an input of a multiplexor 908. An output of the multiplexor 908 is connected to an input of the CRC-Engine 910 and an input of a 16-bit OR gate 912. An output of the CRC-Engine 910 is connected to an input of a 16-bit NOR gate 914. An output of the 16-bit OR gate 912 and an output of the 16-bit NOR gate 914 are each connected to an input of the first AND gate 916. An output of the first AND gate 916 is connected to an input of the first latch 918. The output of the 16-bit NOR gate 914 is also connected to an input of a second AND gate 920 and an input of a second latch 922. An output of the second latch 922 is connected to an input of the second AND gate 920 and to an input of an OR gate 924. The output of the first latch 918 is also connected to an input of the second AND gate 920. An output of the second AND gate 920 is connected to an input of a 4-byte delay 926.

In the embodiment shown in FIG. 9, the input data stream to the FIFO 902 is initially serial or less than thirty-two (32) bits wide. The serial-to-parallel converter 902, the Barker decoder 904, the $X^{75}+1$ descrambler 906, the multiplexor 908, the CRC-16 Engine 910, and 16-bit NOR gate 914 cooperate to perform the steps 502, 504, and 508 of the frame delineation method shown in FIG. 5. The 16-bit OR gate 912 is utilized to perform step 506 of the frame delineation method shown in FIG. 5. The 16-bit NOR gate 914 is utilized to perform step 510 of the frame delineation method shown in FIG. 5. The $X^{75}+1$ descrambler 906, the CRC-Engine 910, and the 16-bit NOR gate 914 cooperate to perform step 516 of the frame delineation method shown in FIG. 5.

Figure 10:
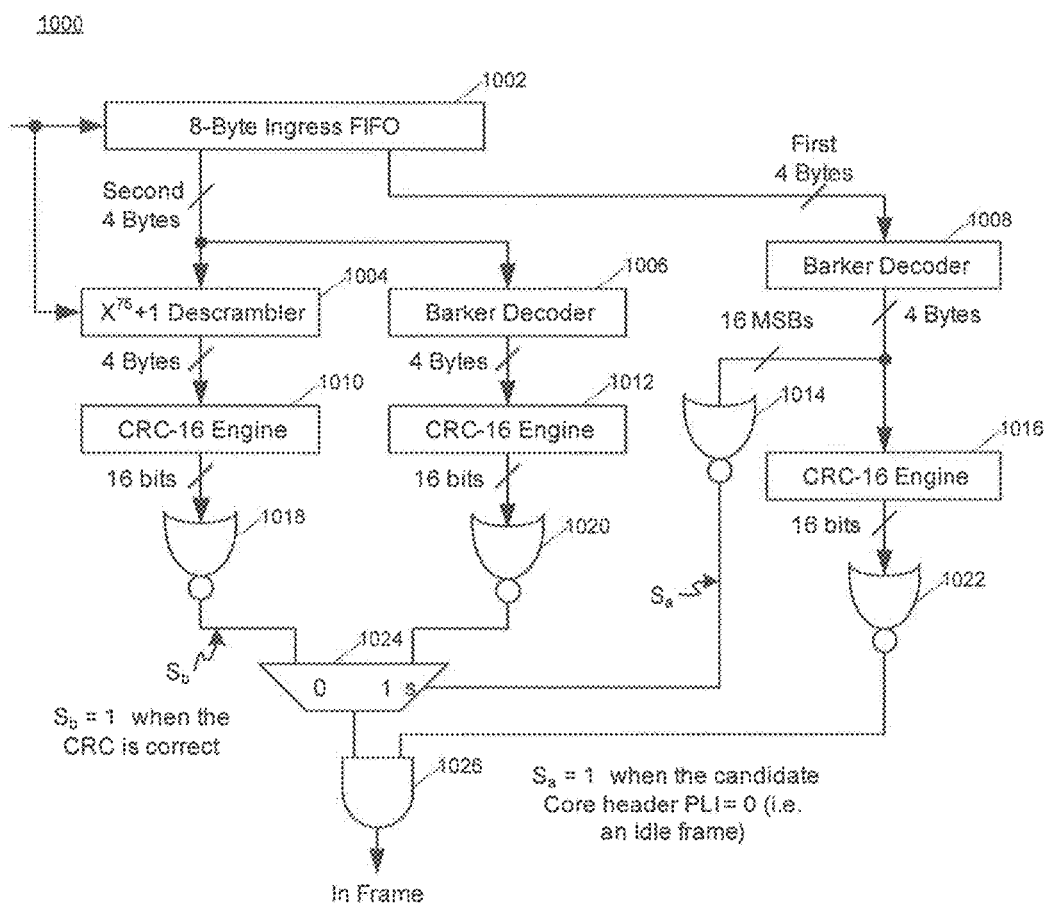
FIG. 10 is a logic block diagram of another example embodiment of hardware for implementing the frame delineation method of the present disclosure.

Referring to FIG. 10, another example of logical block diagram of hardware 1000 that implements the frame delineation method of the present disclosure is shown. The hardware implementation shown in FIG. 10 is optimized for fast parallel processing.

The hardware 1000 shown in FIG. 10 includes an eight (8) byte ingress FIFO 1002. A first output of the eight (8) byte FIFO is connected an input of an $X^{75}+1$ descrambler 1004 and to an input of a first Barker decoder 1006. A second output of the eight (8) byte ingress FIFO 1002 is connected to an input of a second Barker decoder 1008. An output of the $X^{75}+1$ descrambler 1004 is connected to an input of a first CRC-Engine 1010. An output of the first Barker decoder 1006 is connected to an input of a second CRC-Engine 1012. An output of the second Barker decoder 1008 is connected to an input of a first 16-bit NOR gate 1014 and to an input of a third CRC-16 Engine 1016. An output of the first CRC-16 Engine 1010 is connected to an input of a second 16-bit NOR gate 1018, an output of the second CRC-16 Engine 1012 is connected to an input of a third 16-bit NOR gate 1020, and the output of the third CRC-16 Engine 1016 is connected to an input of a fourth 16-bit NOR gate 1022. An output of the second 16-bit NOR gate 1018 is connected to a first input of a multiplexor 1024. An output of the third 16-bit NOR gate 1020 is connected to a second input of a multiplexor 1024. An output of the first 16-bit NOR gate 1014 is connected to a select input of the multiplexor 1024. An output of the multiplexor 1024 is connected to a first input of an AND gate 1026. An output of the fourth 16-bit NOR gate 1022 is connected to a second input of the AND gate 1026.

In the embodiment shown in FIG. 10, the eight (8) byte ingress FIFO 1002 and the second Barker decoder 1008 cooperate to perform the steps 502, 504, and 508 of the frame delineation method shown in FIG. 5. The 16-bit NOR gate 1014 is utilized to perform step 506 of the frame delineation method shown in FIG. 5. The first Barker decoder 1006, the second CRC-Engine 1012, and the 16-bit NOR gate 1020 cooperate to perform step 510 of the frame delineation method shown in FIG. 5. The $X^{75}+1$ descrambler 1004, the first CRC-Engine 1010, and the second 16-bit NOR gate 1018 cooperate to perform step 516 of the frame delineation method shown in FIG. 5.

The hardware 1000 shown in FIG. 10 looks at 64-bit blocks and determines whether the first thirty-two (32) bits includes a Core Header 102 and whether the second thirty-two (32) bits includes either another Core Header 102 or Type Header 116. The logic of the parallel hardware 1000 shown in FIG. 10 includes determining whether the header in the second thirty-two (32) bits is consistent with the PLI value of the Core Header 102 in the first 32 bits (i.e., a PLI=0 in the Core Header 102 of the first thirty-two (32) bits indicates a GFP Idle frame 100, and hence the header in the second thirty-two (32) bits should also be a Core Header 102).

Figure 11:
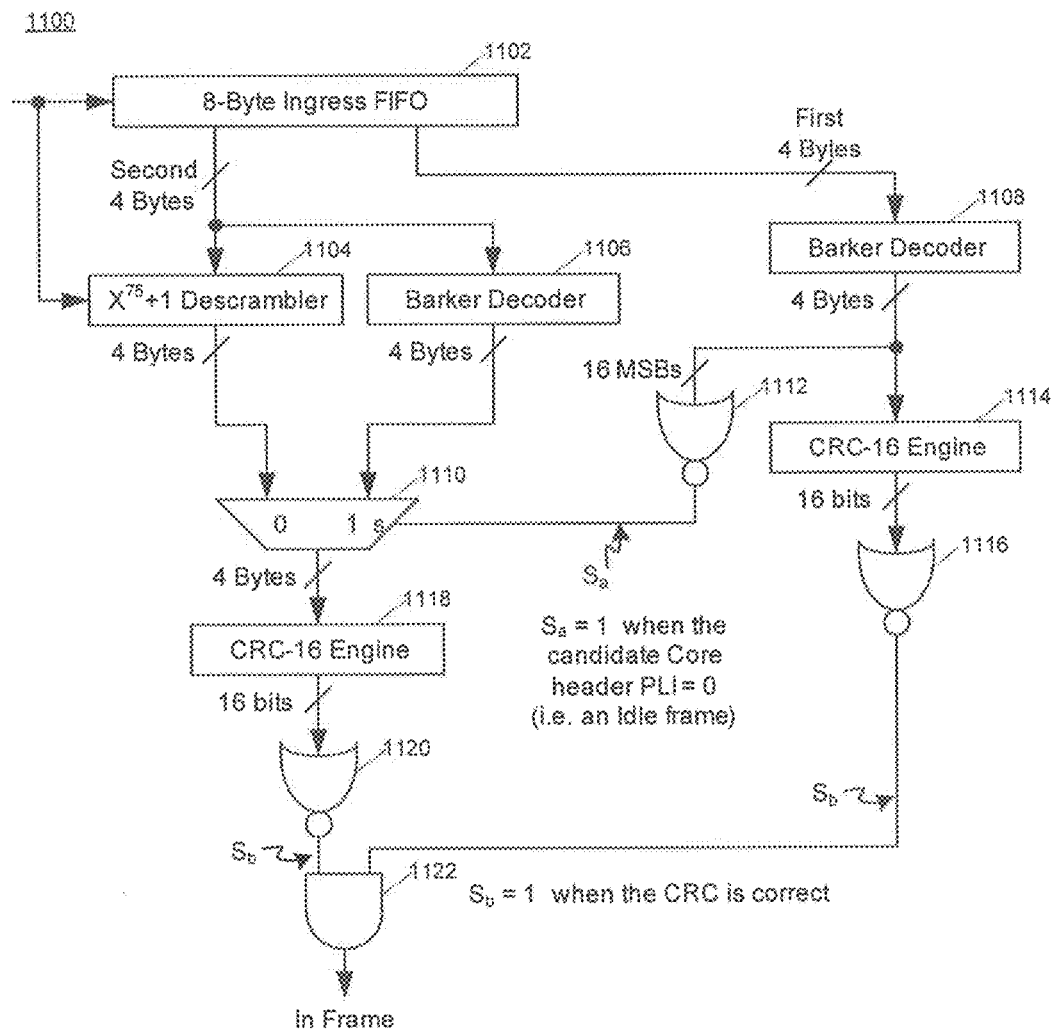
FIG. 11 is a logic block diagram of another example embodiment of hardware for implementing the frame delineation method of the present disclosure.

Referring to FIG. 11, another example of logical block diagram of hardware 1100 that implements the frame delineation method of the present disclosure is shown. The hardware implementation shown in FIG. 11 is a hybrid of the embodiments of FIG. 9 and FIG. 10. The hardware 1100 shown FIG. 11 also looks at sixty-four (64) bit blocks in parallel, but it shares the same CRC engine for both of the potential headers that may exist in the second thirty-two (32) bit block.

The hardware 1100 shown in FIG. 11 includes an eight (8) byte ingress FIFO 1102. A first output of the eight (8) byte FIFO is connected an input of an $X^{75}+1$ descrambler 1104 and to an input of a first Barker decoder 1106. A second output of the eight (8) byte ingress FIFO 1102 is connected to an input of a second Barker decoder 1108. An output of the $X^{75}+1$ descrambler 1104 is connected to an input of a multiplexor 1110. An output of the first Barker decoder 1106 is connected to an input of a multiplexor 1110. An output of the second Barker decoder 1108 is connected to an input of a first 16-bit NOR gate 1112 and to an input of a first CRC-16 Engine 1114. An output of the first CRC-16 Engine 1114 is connected to an input of a second 16-bit NOR gate 1116. An output of the first 16-bit NOR gate 1112 is connected to a select input of the multiplexor 1110. An output of the multiplexor 1110 is connected to an input of a second CRC-16 Engine 1118. An output of the second CRC-16 Engine 1118 is connected to an input of a third 16-bit NOR gate 1120. An output of the second 16-bit NOR gate 116 is connected to a first input of an AND gate 1122. An output of the third 16-bit NOR gate 1120 is connected to a second input of the AND gate 1122.

In the embodiment shown in FIG. 11, the eight (8) byte ingress FIFO 1102, the second Barker decoder 1108, and the first CRC-16 Engine 1114 cooperate to perform the steps 502, 504, and 508 of the frame delineation method shown in FIG. 5. The first 16-bit NOR gate 1112 is utilized to perform step 506 of the frame delineation method shown in FIG. 5. The first Barker decoder 1106, the multiplexor 1110, the second CRC-Engine 1118, and the third 16-bit NOR gate 1116 cooperate to perform step 510 of the frame delineation method shown in FIG. 5. The $X^{75}+1$ descrambler 1104, the multiplexor 1110, the second CRC-Engine 1118, and the third 16-bit NOR gate 1120 cooperate to perform step 516 of the frame delineation method shown in FIG. 5.

In the embodiments shown in FIG. 9, FIG. 10, and FIG. 11, the current Core Header PLI does not need to be stored. Consequently, "PLI" bytes do not need to be counted to find the predicted next Core Header. Another aspect of the embodiments of the present disclosure shown in FIG. 9, FIG. 10, and FIG. 11 is that the same CRC-16 check engine block may be used for both the Core and Type Headers, as long as the data feeding the CRC-16 check engine block has passed through the appropriate descrambler. Another aspect of the hardware implementations shown in FIG. 10 and FIG. 11 is that because the GFP frame delineation method of the present disclosure examines sixty-four (64) consecutive bits of data, the steps 502, 504, 506, 510, and 516 of the frame delineation method of the present disclosure may be performed in parallel. Such parallel processing is not possible with the original G.7041 frame delineation due to the need to wait for the next Core Header location indicated by the current candidate Core Header PLI. Still another key aspect of the hardware implementations of the GFP frame delineation method of the present disclosure shown in FIG. 9, FIG. 10, and FIG. 11 is that the control logic for the GFP frame delineation method of the present disclosure is simpler and much less complex relative to the control logic for the original GFP frame delineation method.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure may be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations may also be stored on the machine-readable medium. The instructions stored on the machine-readable medium may be executed by a processor or other suitable processing device, and may interface with circuitry to perform the described tasks.

The above-described embodiments are intended to be examples only. Alterations, modifications, and variations may be effected to the particular embodiments by those of skill in the art without departing from the scope, which is defined solely by the claims appended hereto.

What is claimed is:

1. A frame delineation method for a generic framing procedure (GFP), the method implemented using a processor and comprising:
    receiving a serial data stream comprising GFP frames;
    performing a frame alignment search by searching, octet by octet, the received serial data stream for an eight octet sequence comprising a first group of four octets comprising a valid Core Header;
    descrambling a second group of four octets of the eight octet sequence based on a plurality of bits of the serial data stream preceding the eight octet sequence, wherein the descrambling is performed during the frame alignment search, and wherein the descrambling is in response to determining that the first group of four octets of the eight octet sequence comprises a valid Core Header and to determining that a payload length indicator of the valid Core Header is not equal to zero; and
    delineating, during the frame alignment search, GFP frames from the received serial data stream in response to determining that the second group of four octets comprises a valid descrambled Type Header.

2. The frame delineation method of claim 1, further comprising delineating, during a frame alignment search, GFP frames from the received serial data stream in response to determining that a first group of four octets of a second eight octet sequence comprises a first valid Core Header and in response to determining that a second group of four octets of the second eight octet sequence comprises a second valid Core Header.

3. The frame delineation method of claim 1, further comprising descrambling the second group of four octets of the eight octet sequence based on forty three bits of the serial data stream that immediately precede the eight octet sequence.

4. The frame delineation method of claim 3, wherein the descrambling is performed using a free-running $X^{75}+1$ self-synchronous descrambler.

5. The frame delineation method of claim 4, further comprising:
    descrambling, using a $X^{43}+1$ GFP payload descrambler, a portion of a payload of a GFP frame that immediately follows the second group of four octets of the eight octet sequence; and
    initializing the $X^{43}+1$ GFP payload descrambler utilizing a combination of information from a Type Header of the second group of four octets of the eight octet sequence and eleven bits that immediately precede the eight octet sequence prior to the $X^{43}+1$ descrambler descrambling the portion of a payload of the GFP frame that immediately follows the second group of four octets of the eight octet sequence.

6. A frame delineation method for a generic framing procedure (GFP), the method implemented using a processor and comprising:
    receiving a serial data stream comprising GFP frames;
    performing a frame alignment search comprising searching the received serial data stream comprising GFP frames to locate a GFP frame having a valid Core Header;
    descrambling a Type Header of the GFP frame based on a plurality of bits of the serial data stream preceding the GFP frame, wherein the descrambling is performed during the frame alignment search, and wherein the descrambling is in response to determining that a payload length indicator of the valid Core Header is not equal to zero; and
    delineating, during the frame alignment search, GFP frames from the serial data stream based on the valid Core Header of the GFP frame and based on the descrambled Type Header of the GFP frame when the descrambled Type Header is valid.

7. The frame delineation method of claim 6, further comprising descrambling the Type Header of the GFP frame based on forty three bits of the serial data stream that immediately precede the GFP frame.

8. The frame delineation method of claim 7, wherein the descrambling is performed using a free running $X^{75}+1$ descrambler.

9. The frame delineation method of claim 8, further comprising:

descrambling, using a $X^{43}+1$ GFP payload descrambler, a portion of the GFP frame; and initializing the $X^{43}+1$ GFP payload descrambler utilizing information from the Type Header of the GFP frame and the last eleven bits preceding the GFP frame prior to the $X^{43}+1$ GFP payload descrambler descrambling the portion of a payload of the GFP frame that immediately follows the Type Header of the GFP frame.

10. A frame delineation method for a generic framing procedure (GFP), the method implemented using a processor and comprising:

receiving a serial data stream comprising GFP frames from a network;

serial-to-parallel converting the received serial data stream;

performing a frame alignment search comprising reading an eight octet sequence from the serial-to-parallel converted data stream;

determining whether a first group of four octets of the eight octet sequence comprises a valid Core Header;

when the first group of four octets of the eight octet sequence comprises a valid Core Header, determining a payload length indicator of the valid Core Header;

when the payload length indicator is not equal to zero, descrambling a second group of four octets of the eight octet sequence based on a plurality of bits of the serial data stream preceding the eight octet sequence and determining whether the descrambled second group of four octets of the eight octet sequence comprises a valid Type Header, wherein the descrambling is performed during the frame alignment search; and delineating, during the frame alignment search, GFP frames from the received serial data stream when the second group of four octets of the eight octet sequence comprises the valid descrambled Type Header.

11. The frame delineation method of claim 10, wherein the descrambling the second group of four octets of the eight octet sequence is based on forty three bits of the serial data stream that immediately precede the eight octet sequence.

12. The frame delineation method of claim 10, wherein the descrambling is performed using a free running $X^{75}+1$ descrambler.

* * * * *